United States Patent [19]
McCambridge

[11] Patent Number: 5,658,193
[45] Date of Patent: *Aug. 19, 1997

[54] RECIPROCATING HAND TOOL WITH MULTIPLE ATTACHMENTS

[75] Inventor: James E. McCambridge, Polo, Ill.

[73] Assignee: Wahl Clipper Corporation, Sterling, Ill.

[*] Notice: The terminal 13 months of this patent has been disclaimed.

[21] Appl. No.: 229,153

[22] Filed: Apr. 18, 1994

[51] Int. Cl.⁶ .................................................. B24B 23/00
[52] U.S. Cl. ........................... 451/356; 451/344; 451/351
[58] Field of Search ..................................... 451/356, 351, 451/164, 344

[56] References Cited

U.S. PATENT DOCUMENTS

| | | | |
|---|---|---|---|
| 1,337,890 | 4/1920 | Dorthen . | |
| 2,307,431 | 1/1943 | Tilden et al. | 51/170 |
| 2,332,613 | 10/1943 | Swank | 51/170 |
| 3,007,230 | 11/1961 | Riedl | 29/76 |
| 3,181,280 | 5/1965 | Bubelis | 51/170 |
| 4,128,970 | 12/1978 | Sawrenko | 51/170 TL |
| 4,512,207 | 4/1985 | Dancsik | 51/170 TL |
| 5,022,189 | 6/1991 | Saul | 51/170 TL |
| 5,209,022 | 5/1993 | McCambridge | 51/181 R |

FOREIGN PATENT DOCUMENTS

| | | |
|---|---|---|
| 1038436 | 8/1966 | United Kingdom . |
| 1228261 | 4/1971 | United Kingdom . |
| 2171623 | 9/1986 | United Kingdom . |
| 2234032 | 1/1991 | United Kingdom . |
| 2271735 | 4/1994 | United Kingdom . |

*Primary Examiner*—Bruce M. Kisliuk
*Assistant Examiner*—Derris Banks
*Attorney, Agent, or Firm*—Greer, Burns & Crain, Ltd.

[57] ABSTRACT

A hand tool for performing an axially reciprocating operation on a workpiece includes a rigid drive member having a longitudinal axis and a coupling formation for releasably securing one of a plurality of task-specific attachments, the coupling formation configured for engaging the attachments along the axis, and a handle portion operatively connected to said the member for grasping by a user to apply force to a workpiece through the drive member to perform an operation thereon. The drive member may be reciprocated manually or by a motorized mechanism. The coupling portion of the drive member secures the attachment against unwanted axial movement. The attachment exerts a clamping force on the drive member.

15 Claims, 2 Drawing Sheets

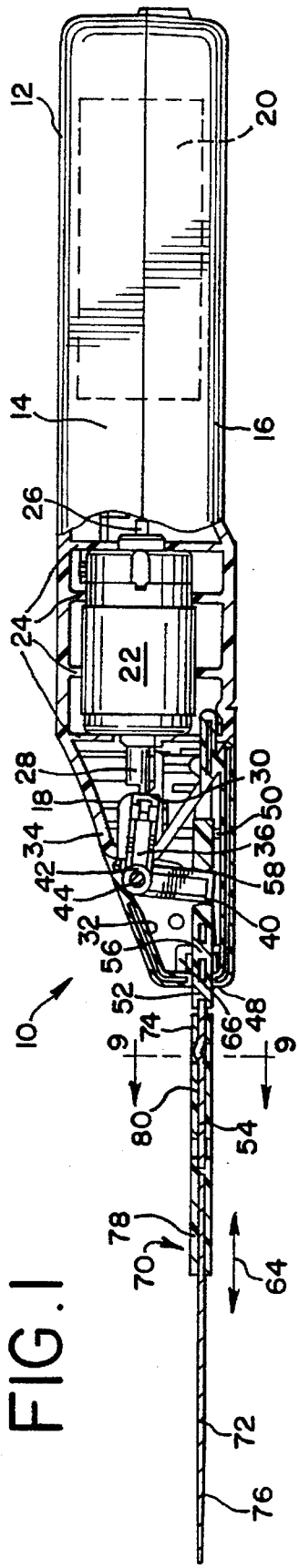
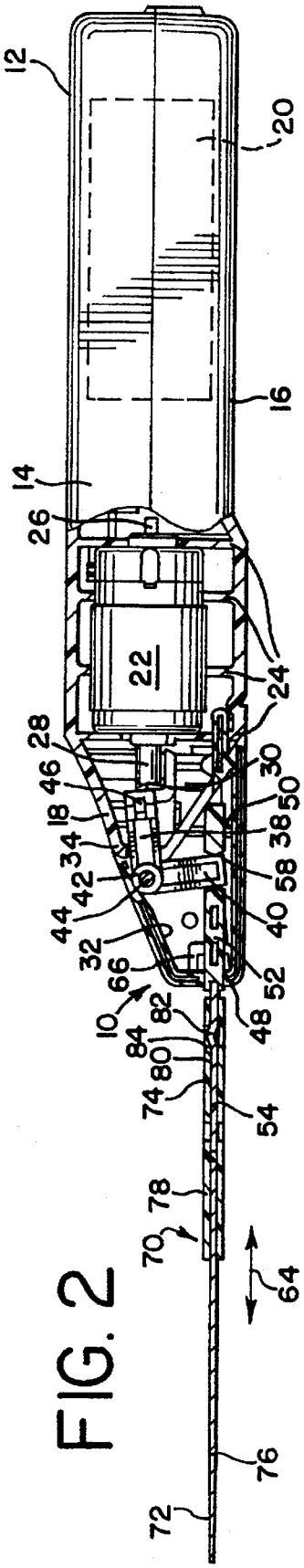
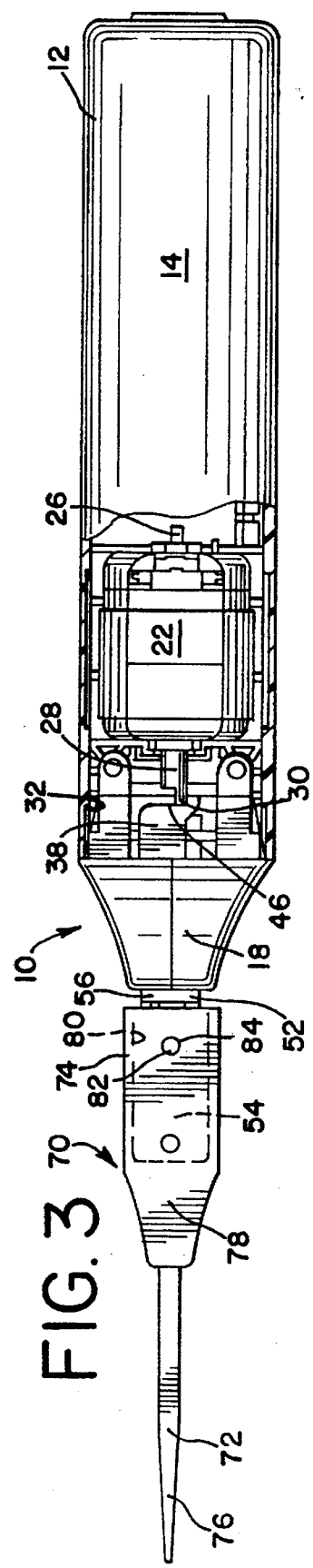

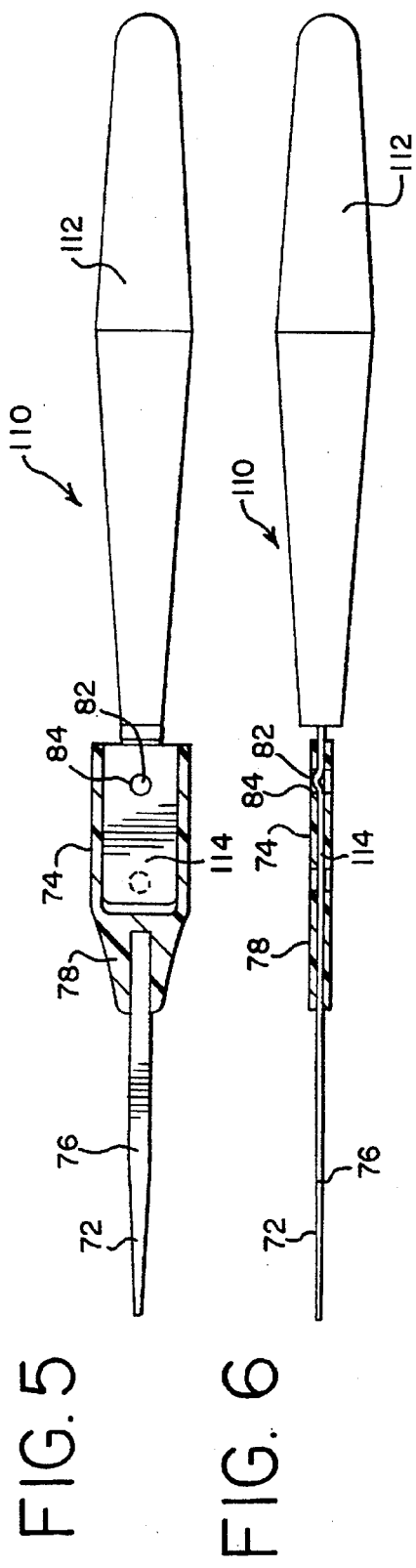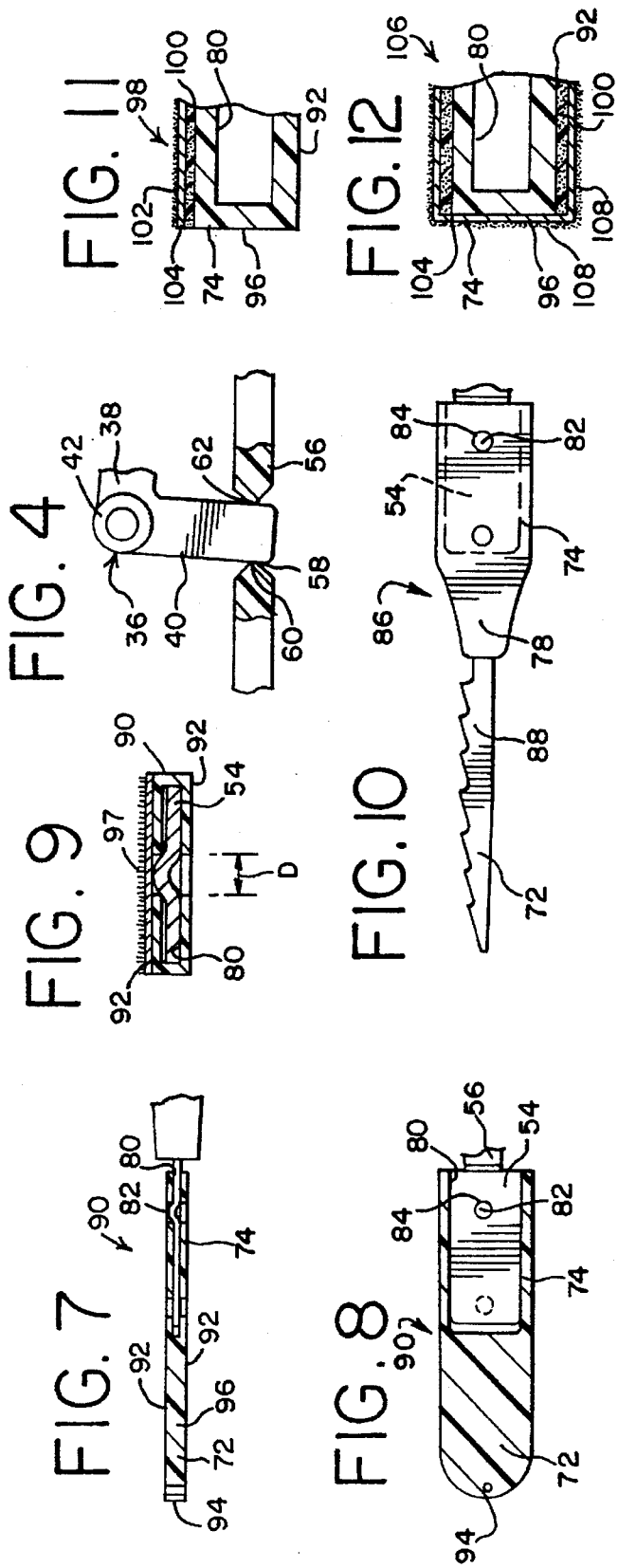

RECIPROCATING HAND TOOL WITH MULTIPLE ATTACHMENTS

BACKGROUND OF THE INVENTION

The present invention relates to tools for performing tasks involving reciprocating motion, such as sanding, grinding, sawing, cutting, polishing and/or buffing, and specifically to such a tool which is constructed to transmit adequate working force to a workpiece for performing such tasks, and which is readily convertible between a variety of such tasks by the mere exchange of working attachments.

Artisans, craftsmen, beauticians, manicurists, hobbyists and industrial workers, among others, often perform reciprocating operations upon workpieces or clients, such operations including filing, sanding, grinding, polishing etc. It is typical for a worker to sequentially progress from operation to operation in the completion of a workpiece, such as from cutting, to sanding, to grinding, to buffing and finally, to polishing. Conventional hand tools are not always suited for performing such operations in small or tightly restricted areas of a workpiece. Further, such readily available tools are unable to optimally apply the force of the working operation directly to the workpiece due to deficiencies in the structural design of the tool. Another factor in performing such operations is that the worker must purchase a variety of individual tools, many of which each represent a duplication of components such as a handle, and/or a combined handle and motor drive assembly. This factor raises the cost of obtaining quality tools for performing a full sequence of required tasks.

In addition, such reciprocating operations are often quite tedious, and many workers opt for powered tools whenever available. Power tools are also desired to alleviate occupational health problems caused by repetitive manual operations, including but not limited to carpal tunnel syndrome. However, conventional power tools suitable for performing operations like grinding, sanding, polishing, etc. are either too powerful and cumbersome, or are unable to perform precision work in a manner which is easily kept under operator control.

Accordingly, a first object of the present invention is to provide a reciprocating tool which is configured to directly apply operational force to the workpiece.

Another object of the present invention is to provide a reciprocating tool which, through the use of a plurality of task-specific attachments, enables a user to perform a variety of tasks with a common handle member.

Still another object of the present invention is to provide a motorized reciprocating tool which is suitable for directing significant work-related forces directly to the workpiece without binding the reciprocating drive mechanism, and which is designed for use with a plurality of task-specific attachments.

Yet another object of the present invention is to provide a set of task-specific attachments suitable for use with reciprocating tools which are either motorized or manually operated.

SUMMARY OF THE INVENTION

The above-identified objects are met or exceeded by the present reciprocating hand tool, which provides a motorized handle assembly or a manually operated handle, both of which are equipped with a rigid drive member for applying reciprocating work forces directly to a workpiece. In addition, the invention provides a plurality of task-specific attachments suitable for reciprocal operation and which are releasably interchangeable with the handle units.

More specifically, a hand tool for performing an axially reciprocating operation on a workpiece includes a rigid drive member having a longitudinal axis and a coupling formation for releasably securing one of a plurality of task-specific attachments along the axis, and a handle portion operatively connected to the member for grasping by a user to apply force to a workpiece through the drive member to perform an operation thereon. The drive member may be reciprocated manually or by a motorized mechanism. The coupling portion of the drive member secures the attachment against unwanted axial movement. The attachments exert a clamping force upon the drive member.

In another embodiment, a reciprocating hand tool for performing an operation on a workpiece includes at least one task-specific attachment having a working portion and a coupling portion, a rigid drive member releasably and operatively coupled to the coupling portion and reciprocally secured by a plurality of bearing surfaces to facilitate a stroke by the rigid drive member, a pivot arm pivotal about a shaft and operatively coupled to the rigid drive member, the pivot arm further positioned to lie between the plurality of bearing surfaces, and a drive device operatively coupled to the pivot arm for driving the rigid drive member in a linearly reciprocating motion. The coupling portion of the at least one attachment is configured to exert a clamping force upon the drive member.

Still another embodiment provides an attachment for a hand tool for performing a reciprocating operation on a workpiece, the hand tool including a rigid drive member having a coupling formation for releasably securing one of a plurality of such attachments. The coupling formation includes at least one detent projecting normally from a longitudinal axis of the drive member and having a base diameter, and a handle portion operatively connected to the drive member for grasping by the user to apply force to a workpiece through the drive member to perform an operation thereon. Included on the attachment is a coupling portion configured for releasably and lockingly engaging the coupling formation of the drive member, the coupling portion including a slot configured for tightly accommodating the drive member against lateral movement, and at least one aperture for engaging the detent for preventing axial movement of said attachment relative to the drive member. Also included on the attachment is a work portion adjacent the coupling portion and constructed for performing a task-specific operation. Attachments are contemplated which are suitable for sanding, grinding, sawing and/or cutting, as well as polishing and/or buffing.

BRIEF DESCRIPTION OF THE DRAWINGS

FIG. 1 is a side elevational view partially in section, of the present reciprocating hand tool shown with a file attachment in the extended position;

FIG. 2 is a side elevational view partially in section of the hand tool shown in FIG. 1, depicted in the retracted position;

FIG. 3 is an overhead plan view, in partial section, of the hand tool of FIG. 2;

FIG. 4 is fragmentary side elevational view of the pivot arm mechanism used to drive the powered reciprocating hand tool of FIGS. 1-3;

FIG. 5 is an overhead plan view in partial section of an alternate embodiment of the present reciprocating hand tool;

FIG. 6 is a side elevational view in partial section of the tool of FIG. 5;

FIG. 7 is a side elevational view in partial section of a sanding/grinding attachment for use with the present hand tool;

FIG. 8 is an overhead plan view in partial section of the attachment of FIG. 7;

FIG. 9 is a section taken along the line 9—9 of FIG. 1 and in the direction generally indicated;

FIG. 10 is an overhead plan view of a saw attachment for use with the present tool;

FIG. 11 is a partial sectional view of an alternate embodiment of the attachment of FIG. 7; and FIG. 12 is a partial sectional view of an alternate embodiment of the attachment of FIG. 11.

DETAILED DESCRIPTION OF THE PREFERRED EMBODIMENT

Referring now to FIGS. 1–3, a motor-driven reciprocating hand tool is generally designated 10, which includes a housing 12 having an upper half 14, a lower half 16 and a nosepiece 18. The upper and lower housing halves 14, 16 are secured to each other to form a handle portion which, in the preferred embodiment, encloses a battery 20 (shown hidden) and an electric motor 22. Although the illustrated embodiment is battery-powered, and preferably with a rechargeable battery, tools 10 powered by conventional alternating current through wall sockets are also contemplated.

A switch (not shown) located on the housing 12 controls the operation of the motor 22. Also, each of the upper and lower housing halves 14, 16 include a plurality of motor support walls 24 for securing the motor 22 in position, as are well known in the art. In the preferred embodiment, the housing components are durable plastic, and the support walls 24 are integrally molded into the corresponding housing halves 14, 16 such as by injection molding. However, other types of housing construction and wall attachment are contemplated, including the use of adhesives.

A shaft 26 is provided to the motor 22, and includes a cam eccentric 28 at one end. The cam eccentric 28 includes a pin 30 which projects into a transmission chamber 32 defined in part by the nosepiece 18 and by a forward end 34 of the upper housing half 14. Also disposed in the transmission chamber 32 is a generally L-shaped pivot arm 36 having a drive leg 38 and a load leg 40. The legs 38 and 40 are joined in generally perpendicular relationship to each other at a transverse tube 42 into which is journalled a transverse shaft 44. The transverse shaft 44 is affixed at each end to the nosepiece 18. An opening 46 in the drive leg 38 accommodates the pin 30. Rotation of the shaft 26 causes a vertical reciprocation of the drive leg 38, which in turn causes a linear reciprocation of the load leg 40 between an extended position (best seen in FIG. 1) and a retracted position (best seen in FIG. 2).

Also located in the transmission chamber 32 is a forward bearing surface or formation 48 and a rearward bearing surface or formation 50. Both of the bearing formations 48, and 50 are axially spaced relative to each other and are configured to support the reciprocating action of a drive member 52. The drive member 52 includes a rigid blade 54 which is secured to a support bar 56. In the preferred embodiment, the support bar is made of rigid plastic, and the blade 54 is made of steel which is insert molded to the blade for a secure attachment. An optimum thickness of the blade 54 is approximately 0.050 inch to provide the desired rigidity. Further, the blade 54 is approximately 0.5 inch wide and in the range of 0.5 to 1.5 inches in length depending on the application. These dimensions have been found to prevent flexing and to permit the application of force in the form of pressure directly to the workpiece without binding the reciprocating action of the tool.

Another feature of the drive member 52 is an opening 58 in the support bar 56 which has front and rear beveled edges 60, 62 (best seen in FIG. 4). The opening 58 is dimensioned to accommodate the load leg 40 of the pivot arm 36. Thus, as the load leg 40 reciprocates between the extended and retracted positions of FIGS. 1 and 2, the drive member 52 similarly reciprocates through the engagement of the load leg 40 in the opening 58. The beveled edges 60, 62 have been found to facilitate a tight grip on the load leg and to reduce unwanted vibration. The forward and rearward bearing surfaces 48, 50 are configured to prevent lateral movement of the drive member 52, while not interfering with its reciprocating movement in the direction of arrows 64. A similar motor-powered reciprocating mechanism using the present "Scotch yoke" style of transmission is described in my prior U.S. Pat. No. 5,209,022 which is incorporated by reference herein.

It is preferred that the nosepiece 18 be provided with a dust seal holder 66 (best seen in FIGS. 1 and 2) located just behind the forward bearing surface 48 and inside the transmission chamber 32. The holder 66 is preferably integrally molded with the nosepiece 18, and defines an enclosure which surrounds the reciprocating drive member 52. A rubber or foam sealing material (not shown) may be placed within the holder to surround the drive member and prevent the entry of dust into the chamber 32. The sealing material is selected for its ability to retard the entry of dust while permitting free sliding action of the drive member 52.

In the device disclosed in U.S. Pat. No. 5,209,022, I provided a flexible drive arm to maximize the use of the tool for sharpening purposes. Thus, variations on the load placed on the working or sharpening media or stone had specified effects on the speed and power transmitted to the reciprocating stone by the motor. However, when performing the sort of operations envisioned by the present invention, the flexible drive arm of the prior patent would not be suitable, since when grinding, sanding, sawing, filing, etc., one requires a direct transfer of working force or pressure. In addition, the force must be applied without binding the reciprocating mechanism including the pivot arm 36, the support bar 56, and the forward and rearward bearing assemblies 48, 50. Accordingly, in the present device 10, the support bar 56 and the rigid blade 54 are constructed to remain rigid upon the application of working pressure, and to avoid any perceptible flexing.

Referring again to FIGS. 1–3, to perform a specific task with the tool 10, one must obtain at least one of a plurality of task-specific attachments. The tool 10 is illustrated as being equipped with a file attachment, generally designated 70. The attachment 70 includes a working end 72 and a coupling end 74 adjacent and axially aligned with the working end. At the working end 72 is provided a narrow file blade 76, the base of which is secured, as by insert molding, to a holding portion 78 of the coupling end 74. In the preferred embodiment, the holding portion is tapered (best seen in FIG. 3) to facilitate the entry of the attachment 70 into tight work spaces. The coupling end is preferably made of a plastic which is durable, chemical resistant, somewhat flexible, and which may be insert molded around a tool blade such as the blade 76. One type of plastic which has been found suitable for this application is acetal.

Rearwardly of the holding portion, the coupling end 74 defines a slot 80 which is dimensioned to tightly yet slidingly accommodate the rigid blade 54 to prevent lateral movement of the blade relative to the attachment 70. In the preferred embodiment, the slot 80 has a height of approximately 0.050 inch, a width of approximately 0.5 inch, and a length of approximately 1 inch. The length of the slot 80 may vary to support longer tool blades 76.

In addition to the prevention of lateral movement, the tool 10 is designed so that the attachment 80 will not become prematurely disengaged from the rigid blade 54. To this end, the blade 54 is provided with at least one detent 82 which projects normally from a plane defined by the blade 54, and also normally to the longitudinal axis of the tool 80. The detent 82 has a base diameter "D", and may be found on either an upper or lower surface of the rigid blade 54.

Engaging the detent 82 is an opening 84 in the coupling end 74 which also has a diameter which approximates the base diameter "D" of the detent, and also has a depth which preferably approximates, and is slightly greater than, the height of the detent. Another factor in determining the height of the detent 82 is that the attachment 70 must be disengageable from the blade 54 by pulling the attachment axially away from the blade. If the detent is too tall, it will be too difficult to remove the attachment 70. When the motor 22 is not operating, there is sufficient resistance in the pivot arm 36 and the linkage of the pin 30 to create a firm support for the removal of the attachment 70.

An important feature of the coupling end 74 is that it exerts a clamping force upon the drive member 52, specifically at the rigid blade 54. This clamping force is generated by selecting a material for the attachment which has a desired amount of resilience for the application. The clamping force may also be adjusted by tightening the fit of the slot 80 about the blade 54, or by changing the thickness of the walls of the coupling end 74 which define the slot 80. Thus, the attachment 70 is secured upon the blade 54 by the engagement of the detent 82 in the opening 84, as well as by the clamping force generated by the coupling end 74. It will be appreciated that, depending on the type of attachment, that additional detents and openings, and/or additional clamping force may be required to prevent the unwanted axial disengagement of the attachment from the blade 54.

Referring now to FIG. 10, an alternate embodiment to the attachment 70 is generally designated 86. Reference characters designating features identical to those of FIGS. 1–3 have been reused. The attachment 86 also includes a working end 72 and a coupling end 74. The only significant difference between the attachments 86 and 70 is that the file blade 76 has been replaced by a saw blade 88. As is the case with the attachment 70, the attachment 86 is axially insertable on, and removable from the rigid blade 54, and includes an opening 84 for engaging the detent 82. The action of the detent 82 in preventing unwanted axial movement of the attachment 86 relative to the rigid blade 54 is especially important when the teeth of the saw blade 88 are configured such that the saw cuts on the retracting or pulling stroke. This type of blade construction will generate additional stress on the attachment, and will have a tendency to disengage the attachment from the blade in the absence of the detent.

Referring now to FIGS. 7–9, another alternate attachment is generally designated 90. The attachment 90 includes a working end 72 and a coupling end 76, and the coupling end 76 is identical with those described earlier. However, at the working end 72, the blade 76 has been replaced with a pair of generally vertically flattened surfaces 92 having a rounded tip 94 when viewed from above (best seen in FIG. 8). An additional working surface is provided along the peripheral edge 96.

A principal advantage of the attachment 90 is the provision of a base surface to which a plurality of coatings or materials may be applied. Generally, the attachment 90 may be used for sanding, grinding, buffing or polishing, depending on the material applied thereon. For the purposes of this application, the terms buffing and polishing may be used interchangeably, and are intended to refer to some sort of exertion of an action, including a mild abrasive action, on a workpiece to obtain a desired finish.

Referring now to FIG. 9, a soft polishing material has been applied to one of the surfaces 92, such as by adhesive. Although only one of the surfaces 92 is shown as being coated, it is contemplated that the other flattened surface 92, as well as the edge surface 96 may also be covered, so that all of the surfaces of the attachment 90 may be employed in the polishing operation.

Referring now to FIG. 11, yet another attachment embodiment is generally designated 98, which is basically the attachment 90 to which a layer of resilient foam 100 has been secured. Upon the foam 100 is releasably secured a sheet of sandpaper 102 equipped with a releasable, peel-off type adhesive 104. This embodiment is contemplated as being especially suited for manicurists. Naturally, it is contemplated that sheets of sandpaper 102 may readily be applied to all surfaces of the attachment 98 as described above in relation to the attachment 80. The same holds true for the resilient foam 100.

Referring now to FIG. 12, a modification of the attachment embodiment 98 is generally designated 106, and is basically the attachment 80 upon which has been applied a coating 108 of abrasive granules for grinding purposes. An adhesive layer 104 is used to attach the granules to the attachments 80. The granules 108 may be directly applied to all of the working surfaces of the attachment, or may be alternatively applied upon a layer of resilient foam 100 as described above. It will be appreciated that the embodiments of FIGS. 9, 10 and 11 will all be releasably engaged upon the rigid blade 54 and retained thereon by the engagement between the detent 82 and the opening 84.

Referring now to FIGS. 5 and 6, although the attachments depicted in FIGS. 1–3 and 7–12 were described as being releasably engageable upon the reciprocating rigid blade 54 of the motor powered reciprocating hand tool 10, it is also contemplated that these attachments, as well as others having similar coupling ends 74, may also be employed with a manually reciprocated tool. Such a manually-operated tool is generally designated 110, and includes a handle 112 made of rigid plastic or other suitable rigid and durable material. A rigid blade 114, which is identical in configuration to the rigid blade 54, is secured to the handle 112 by insert molding, adhesive or other secure, permanent fastening device. The specific shape of the handle 112 may vary depending on the application, and among other considerations, whether the tool 110 is designed to be left-handed or right-handed.

All of the attachments 70, 86, 90, 98, and 106 having the coupling end 74 including the slot 80 and the opening 84, may be releasably engaged on the blade 114 in the same manner as upon the blade 54 of the tool 10. Once the attachment is secured, the user grasps the handle 112 and manually reciprocates the tool 110 upon the workpiece. As is the case with the tool 10, the rigidity of the blade 114 facilitates the transmission of working pressure through the attachment and to the workpiece to accomplish the specified task.

In operation, regardless of whether the motorized tool 10 or the manual tool 110 is used, the user selects the appropriate task-specific attachment and axially presses it upon the rigid blade 54, 114 so that the slot 80 of the coupling end 74 matingly engages the blade and the detent 82 engages the opening 84. Then, referring to the motorized tool 10, the user actuates the switch to begin the automatic reciprocating action, grasps the housing 12 and commences work. With the manual tool 110, the user grasps the handle 112 and manually generates the reciprocating action. Whether manual or motorized, the reciprocating action follows the same axis as the longitudinal axis of the drive member 52, and the attachments are also axially disengaged from the drive member when operations are to be changed. A feature of the coupling system of the present reciprocating tool is that the attachments are engaged upon the blade in the same axial direction in which the selected operation is to be performed. Another feature is that the attachments themselves exert a clamping force upon the drive member to prevent unwanted disengagement.

While a particular embodiment of the reciprocating hand tool of the invention has been shown and described, it will be appreciated by those skilled in the art that changes and modifications may be made thereto without departing from the invention in its broader aspects and as set forth in the following claims.

What is claimed is:

1. A combination of a reciprocating hand tool for performing an axially reciprocating operation on a workpiece and one of a plurality of task-specific attachments for the hand tool for performing a reciprocating operation on the workpiece, the combination comprising:

a hand tool comprising:

a rigid drive member having a longitudinal axis and a coupling means for releasably securing one of the plurality of task-specific attachments, said coupling means configured for engaging the attachments to said rigid drive member along said axis and including at least one detent projecting normally from a longitudinal axis of said drive member and having a base diameter;

a handle portion operatively connected to said rigid drive member by a plurality of bearing means, whereby said bearing means is configured to facilitate a reciprocal stroke by said rigid drive member relative to said handle, and whereby said handle portion is for grasping by a user to apply force to the workpiece through said drive member to perform operation thereon;

a drive means, operatively coupled to a pivot arm, for driving said rigid drive member in a linearly reciprocating motion, and including a cam eccentric;

a generally L-shaped pivot arm pivotal about a shaft transverse to said axis, said pivot arm having a first leg operatively coupled to said cam eccentric for creating a vertically reciprocating motion, and a second leg operatively coupled to said rigid drive member, said second leg further positioned to lie between said plurality of bearing means so that said vertical reciprocating motion of said first leg causes a generally horizontal, linear reciprocating motion of said second leg for driving said rigid drive member in a generally horizontal, linearly reciprocating motion; and said drive member releasably attached to one of a plurality of task-specific attachments, each said attachment comprising:

a coupling portion configured for releasably and lockingly engaging said coupling means of said drive member, said coupling portion including a slot configured for tightly accommodating said drive member against lateral movement, and at least one aperture for engaging said at least one detent for preventing axial movement of said attachment relative to said drive member; and a work portion adjacent said coupling portion and constructed for performing a task-specific operation.

2. The combination as defined in claim 1 wherein said drive member is constructed and arranged to remain rigid upon the exertion of a substantially normal force being exerted thereon.

3. The combination as defined in claim 1 wherein said drive member is provided with locking means for preventing the attachment from axially disengaging from said drive member while in operation.

4. The combination as defined in claim 1 further including a housing having a transmission portion for enclosing said bearing means, said pivot arm, said drive means and a portion of said drive member, and a handle portion for grasping said housing to apply force to a workpiece through said attachment to perform an operation thereon.

5. The combination as defined in claim 1 wherein said working portion is configured as a file.

6. The combination as defined in claim 1 wherein said working portion is configured as a sanding block.

7. The combination as defined in claim 1 wherein said working portion is provided with a soft surface for polishing.

8. An attachment for a hand tool for performing a reciprocating operation on a workpiece, the hand tool including a rigid drive member having coupling means for releasably securing one of a plurality of said attachments, the coupling means including at least one detent projecting normally from a longitudinal axis of the member and having a base diameter, and a handle portion operatively connected to said drive member for grasping said housing to apply force to a workpiece through said drive member to perform an operation thereon, said attachment comprising:

a coupling portion configured for releasably and lockingly engaging the coupling means of the drive member, said coupling portion including a slot configured for tightly accommodating the drive member against lateral movement, and at least one aperture for engaging the detent for preventing axial movement of said attachment relative to the drive member; and a work portion adjacent said coupling portion and constructed for performing a task-specific operation.

9. The attachment as defined in claim 8 wherein said at least one aperture has a base diameter which generally corresponds to the base diameter of the detent.

10. The attachment as defined in claim 9 wherein said coupling portion includes a tapered holding area to which is secured the base of a tool.

11. The attachment as defined in claim 10 wherein said tool is a file.

12. The attachment as defined in claim 10 wherein said tool is a saw.

13. The attachment as defined in claim 8 wherein said work portion includes a base coated with an abrasive.

14. The attachment as defined in claim 13 wherein said abrasive is removable from said work portion.

15. The attachment as defined in claim 8 wherein said work portion includes a base upon which is fastened a buffing media.

* * * * *